United States Patent
Walters et al.

(10) Patent No.: US 11,352,147 B2
(45) Date of Patent: Jun. 7, 2022

(54) ELECTRICAL ISOLATOR FITTING

(71) Applicant: SHORT BROTHER PLC, Belfast (GB)

(72) Inventors: Stephen Walters, Downpatrick (GB); David Chivers, Belfast (GB)

(73) Assignee: SHORT BROTHERS PLC, Belfast (GB)

( * ) Notice: Subject to any disclaimer, the term of this patent is extended or adjusted under 35 U.S.C. 154(b) by 489 days.

(21) Appl. No.: 16/533,239

(22) Filed: Aug. 6, 2019

(65) Prior Publication Data

US 2020/0055611 A1 Feb. 20, 2020

(30) Foreign Application Priority Data

Aug. 15, 2018 (GB) ...................................... 1813331

(51) Int. Cl.
*B64D 37/32* (2006.01)
*H01B 17/38* (2006.01)
*B64C 3/34* (2006.01)

(52) U.S. Cl.
CPC ................ *B64D 37/32* (2013.01); *B64C 3/34* (2013.01); *H01B 17/38* (2013.01)

(58) Field of Classification Search
CPC .......... B64D 37/32; B64C 3/18; B64C 3/187; H01B 17/38; F16L 5/00
See application file for complete search history.

(56) References Cited

U.S. PATENT DOCUMENTS 2,813,692 A * 11/1957 Peterson .............. H01B 17/306
    248/56
7,681,923 B2 * 3/2010 Negley ..................... F16L 5/12
    285/139.1
8,307,592 B2 * 11/2012 Chang ....................... F16L 5/14
    52/220.8

(Continued)

FOREIGN PATENT DOCUMENTS

EP 2402252 A1 1/2012
EP 3103724 A1 12/2016

(Continued)

OTHER PUBLICATIONS

Extended European Search Report dated Jan. 10, 2020, for European Patent Application No. 19190230.3.

(Continued)

*Primary Examiner* — Michael H Wang
(74) *Attorney, Agent, or Firm* — Hovey Williams LLP

(57) ABSTRACT

An isolator fitting for an opening in a metallic rib of an aircraft wing. The isolator fitting has first isolator mountable to the rib to position a first isolator opening in alignment with the opening of the rib. A second isolator is mountable to the rib and has a nut housing segment defining a second isolator opening to be positioned in alignment with the opening of the rib. A conduit extends between a first end and a second end, and a nut is mountable about an outer surface of the conduit to abut against the first isolator and mount the conduit thereto. The conduit is positionable to extend through the opening of the rib and through the first and second isolator openings to position the nut within the nut housing segment of the second isolator such that the nut housing segment is positioned between the nut and the rib.

29 Claims, 7 Drawing Sheets

(56) References Cited

U.S. PATENT DOCUMENTS

| | | | |
|---|---|---|---|
| 8,894,014 B2 * | 11/2014 | Yonezawa | B64D 45/02 |
| | | | 244/135 R |
| 9,061,768 B2 | 6/2015 | Hansom et al. | |
| 9,233,758 B2 | 1/2016 | Hansom et al. | |
| 9,366,364 B2 * | 6/2016 | Wright | F16L 5/02 |
| 9,932,106 B1 | 4/2018 | Gardiner et al. | |
| 2014/0144002 A1 * | 5/2014 | Conchi, Jr. | B23P 11/00 |
| | | | 29/525.02 |
| 2014/0232103 A1 | 8/2014 | Waugh | |
| 2016/0356403 A1 | 12/2016 | Perrigo et al. | |
| 2017/0066542 A1 | 3/2017 | James et al. | |

FOREIGN PATENT DOCUMENTS

| | | |
|---|---|---|
| EP | 3141484 A1 | 3/2017 |
| WO | 2016007578 A1 | 1/2016 |

OTHER PUBLICATIONS

United Kingdom Search Report dated Oct. 5, 2018, for United Kingdom Patent Application No. GB1813331.4.

\* cited by examiner

ELECTRICAL ISOLATOR FITTING

CROSS-REFERENCE TO RELATED APPLICATION(S)

This application relies on and claims priority to United Kingdom Patent Application No. GB 1813331.4, filed on Aug. 15, 2018, the entire content of which is incorporated herein by reference.

TECHNICAL FIELD

The application relates generally to electrically-isolating attachments and, more particularly, to an electrical isolator fitting for an aircraft wing.

BACKGROUND

Aircraft fuel tanks which are located on the wing have internal metallic ribs which define and extend through the fuel tank. Throughout the fuel tank structure run multiple systems including fuel, electric and hydraulic for conveying system requirements to various locations. Aircraft certification standards require that lightning which may strike the external surface of the wing and which may be transmitted to the metallic rib be isolated so that the electrical current of the lightning strike cannot create an ignition source to the fuel inside the fuel tank by arcing to nearby metallic structure or systems. It may also be necessary to provide an electrical bonding path for other electrical discharges, such as static and electrical currents generated by fuel sloshing in the fuel tank, fluids flowing through metallic piping, faults, or shorts in the aircraft electrical system.

SUMMARY

In one aspect, there is provided an aircraft wing, comprising: a fuel tank defined between ribs and a skin of the wing, at least one of the ribs being metallic and defining a first side and a second side, the at least one rib having an opening wall delimiting an opening in the at least one rib extending between the first and second sides; and an isolator fitting, comprising; a first isolator mounted to the at least one rib and having a first isolator opening; a second isolator mounted to the at least one rib and having a nut housing segment defining a second isolator opening; and a conduit extending between a first end and a second end, and a nut mounted about an outer surface of the conduit and abutted against the first isolator, the conduit extending through the opening of the at least one rib and through the first and second isolator openings, the nut disposed within the nut housing segment of the second isolator to position the nut housing segment between the nut and the opening wall of the at least one rib, a tracking distance being defined between the outer surface of the conduit and the opening wall to electrically insulate the conduit from the at least one rib.

In an embodiment of the aircraft wing, the second isolator abuts against the first side of the at least one rib, and the first isolator abuts against the second isolator on the first side of the at least one rib.

In an embodiment of the aircraft wing, a gap is defined between the opening wall of the at least one rib and the nut, the nut housing segment of the second isolator being disposed within the gap and spaced apart from both the opening wall and the nut.

In an embodiment of the aircraft wing, a sealant is disposed in the gap between the nut housing segment and the nut.

In an embodiment of the aircraft wing, the second isolator includes a flange segment extending outwardly from the nut housing segment and mounted to the at least one rib, the nut housing segment having an axial portion extending from the flange segment and being positioned in the opening between the nut and the opening wall of the at least one rib, the nut housing segment having a radial portion extending from the axial portion to a distal end having a second applicator opening wall delimiting the second applicator opening.

In an embodiment of the aircraft wing, the tracking distance is defined along at least a surface defined by the axial portion and the radial portion.

In an embodiment of the aircraft wing, the flange segment of the second isolator is disposed between the first isolator and the first side of the at least one rib, the flange segment abutting against a first side of the first isolator and the nut abutting against the first side of the first isolator.

In an embodiment of the aircraft wing, the conduit is metallic and has a permanent nut fixedly attached to the outer surface and a threaded segment extending along a length of the outer surface, the nut mounted to the threaded segment and spaced apart from the permanent nut to define an isolator gap, a portion of the first isolator being positioned in the isolator gap between the nut and the permanent nut.

In an embodiment of the aircraft wing, the aircraft wing further comprises a plurality of fluid pipe segments, one of the fluid pipe segments being mounted to the outer surface of the first end of the conduit on the first side of the at least one rib, and another one of the fluid pipe segments being mounted to the outer surface of the second end of the conduit on the second side of the at least one rib.

In an embodiment of the aircraft wing, the first isolator and the second isolator are configured to dissipate electrical charge into the at least one rib.

In an embodiment of the aircraft wing, the at least one rib and the first and second isolators include aligned fastener openings spaced apart from the opening of the at least one rib, and the isolator fitting further comprises fasteners extending through the aligned fastener openings between the first and second sides of the at least one rib.

In an embodiment of the aircraft wing, the at least one rib is a baffle rib, the aircraft wing further comprising a fluid pipe extending between the ribs, the fluid pipe being mounted to the baffle rib with the isolator fitting, the fluid pipe being mounted to at least another one of ribs with a moveable isolating bracket.

In an embodiment of the aircraft wing, the first and second isolators are made of polyetheretherketone.

In an embodiment of the aircraft wing, the tracking distance is at least 0.5 inches.

In another aspect, there is provided an isolator fitting positionable about an opening in a metallic rib of an aircraft wing, the isolator fitting comprising: a first isolator mountable to the rib to position a first isolator opening in alignment with the opening of the rib; a second isolator mountable to the rib and having a nut housing segment defining a second isolator opening to be positioned in alignment with the opening of the rib; and a conduit extending between a first end and a second end, and a nut mountable about an outer surface of the conduit to abut against the first isolator and mount the conduit thereto, the conduit being positionable to extend through the opening of the rib and through the first and second isolator openings to position the nut within the nut housing segment of the second isolator such that the nut housing segment is positioned between the nut and the rib.

In an embodiment of the isolator fitting, the second isolator is abuttable against a first side of the rib, and the first isolator is abuttable against the second isolator on the first side of the rib.

In an embodiment of the isolator fitting, the second isolator includes a flange segment extending outwardly from the nut housing segment and mountable to the rib, the nut housing segment having an axial portion extending from the flange segment and being positionable between the nut and the opening of the rib, the nut housing segment having a radial portion extending from the axial portion to a distal end having a second applicator opening wall delimiting the second applicator opening.

In an embodiment of the isolator fitting, the flange segment of the second isolator is positionable between the first isolator and a first side of the rib, the flange segment being abuttable against a first side of the first isolator, and the nut being abuttable against the first side of the first isolator.

In an embodiment of the isolator fitting, the conduit is metallic and has a permanent nut fixedly attached to the outer surface and a threaded segment extending along a length of the outer surface, the nut being mountable to the threaded segment to be spaced apart from the permanent nut to define an isolator gap, a portion of the first isolator being positionable in the isolator gap between the nut and the permanent nut.

In an embodiment of the isolator fitting, the first and second isolators are configured to dissipate electrical charge into the rib.

In an embodiment of the isolator fitting, the first and second isolators include aligned fastener openings spaced apart from the first and second isolator openings, and the isolator fitting further comprises at least one fastener being extendable through the aligned fastener openings.

In an embodiment of the isolator fitting, the first and second isolators are made of polyetheretherketone.

In a further aspect, there is provided a method of electrically insulating and supporting a fluid pipe from a metallic rib of an aircraft wing, the method comprising: mounting a first isolator about a conduit to extend the conduit through a first isolator opening of the first isolator; securing the first isolator to the conduit by tightening a nut about an outer surface of the conduit to abut the first isolator; mounting a second isolator about the conduit to at least partially enclose the nut such that the nut is housed within a segment of the second isolator, the segment defining a second isolator opening; securing the first and second isolators to the metallic rib to support the conduit therefrom such that the conduit extends through an opening in the metallic rib and through the first and second isolator openings; and mounting the fluid pipe to the conduit.

In an embodiment of the method, securing the first and second isolators to the metallic rib includes abutting the second isolator against a first side of the rib, and abutting the first isolator against the second isolator on the first side of the rib.

In an embodiment of the method, securing the first and second isolators to the metallic rib includes forming a gap between the rib and the nut, the segment of the second isolator being disposed within the gap and spaced apart from both the rib and the nut.

In an embodiment of the method, the method further comprises filling the gap with a sealant.

In an embodiment of the method, mounting the fluid pipe includes mounting a first fluid pipe segment to a first end of the conduit, and mounting a second fluid pipe segment to a second end of the conduit opposite to the first end.

In an embodiment of the method, the method further comprises transferring an electrical charge from the first and second isolators to the rib.

In an embodiment of the method, the method further comprises arresting sliding movement of the conduit along a direction parallel to an axis of the opening in the rib.

DESCRIPTION OF THE DRAWINGS

Reference is now made to the accompanying figures in which.

DETAILED DESCRIPTION

Figure 1:
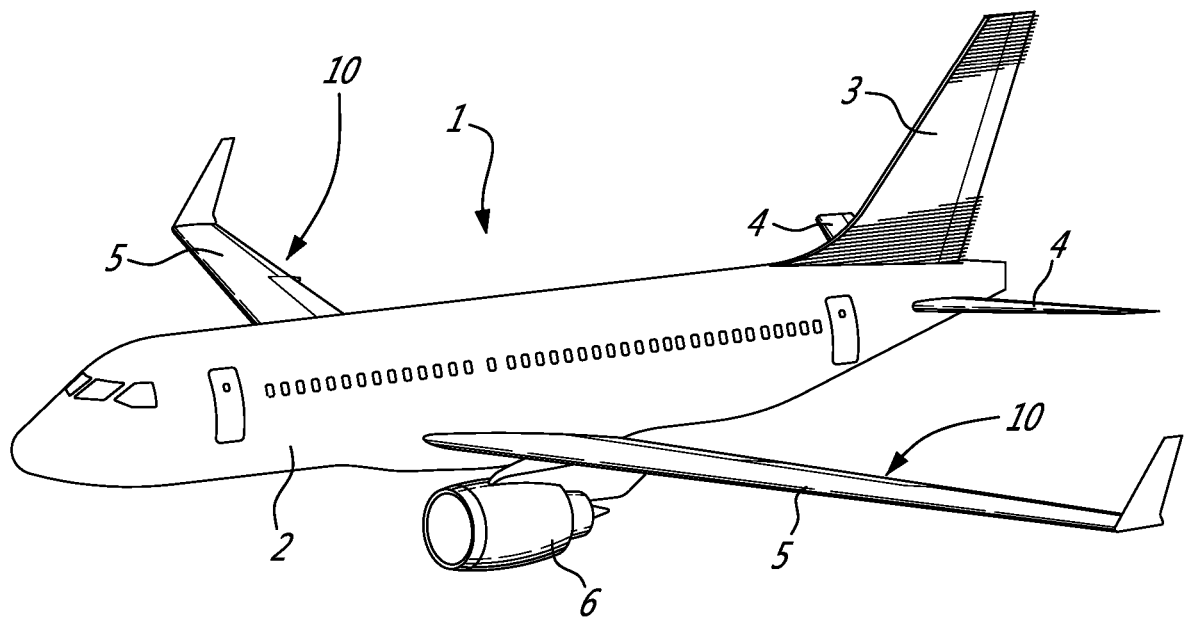
FIG. 1 is a schematic tridimensional view of an aircraft.

Referring to the drawings and more particularly to FIG. 1, an aircraft is shown at 1, and is generally described to illustrate some components for reference purposes in the present disclosure. The aircraft 1 has a fuselage 2 having a fore end and an aft end, with a cabin generally located between the cockpit and the tail assembly. A tail assembly comprises a vertical stabilizer 3 with a rudder, and horizontal stabilizers 4 with elevators. The tail assembly has a fuselage-mounted tail, but other configurations may also be used for the aircraft 1, such as cruciform, T-tail, etc. Wings 5 project laterally from the fuselage 2. The aircraft 1 has engines 6 mounted to the wings 5 in the depicted embodiment, although for other aircraft they can be supported by the fuselage 2. The aircraft 1 is shown as a jet-engine aircraft, but may also be a propeller aircraft. It is also understood that the aircraft 1 can be a business aircraft, alternately it can be any other type of aircraft, including, but not limited to, a commercial aircraft or a military aircraft.

Figure 2:
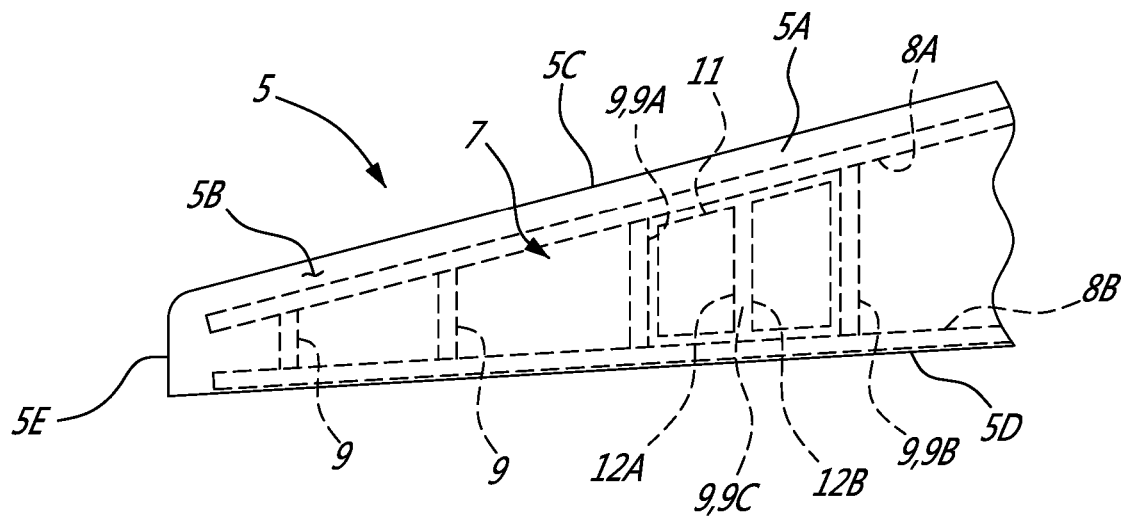
FIG. 2 is a top view of a wing of the aircraft shown in FIG. 1, showing a fuel tank and ribs.

FIG. 2 shows part of one of the wings 5 of the aircraft 1. The wing 5 has an airfoil body 5A whose acting surfaces are defined by a skin 5B of the wing 5 being formed about an internal frame 7 or structure of the wing 5. The airfoil body 5A extends along a longitudinal axis of the aircraft 1 between a leading edge 5C of the wing 5, and a trailing edge 5D of the wing 5. The airfoil body 5A extends along a spanwise axis of the wing 5, or along a lateral axis of the aircraft 1, between a root (not shown in FIG. 2) of the airfoil body 5A and a tip 5E of the airfoil body 5A. A span of the wing 5 is defined between the root and the tip 5E. The internal frame 7 of the wing 5 includes any suitable arrangement of spars, ribs, stringers, and other members. In FIG. 2, the internal frame 7 includes a front spar 8A and a rear or aft spar 8B, which are interconnected by multiple transverse ribs 9. In the depicted embodiment, the skin 5B of the wing 5 includes carbon fibre and has stringers. The front and aft spars 8A,8B are also made from composite, non-metallic materials such as carbon fibre, and the ribs 9 are metallic. Other constructions for the wing 5 are possible and within the scope of the present disclosure.

The wing 5 includes an internal and integral fuel tank 11. The fuel tank 11 is a void in the wing 5 that is defined and delimited by some of the ribs 9 and the skin 5B of the wing 5. In the depicted embodiment, the fuel tank 11 is delimited by upper and lower composite skins 5B, composite front and aft spars 8A,8B and metallic ribs 9. These components provide the boundary to form the integral fuel tank 11 as an internal structure of the wing 5. FIG. 2 shows that the fuel tank 11 is delimited by an outboard rib 9A and an inboard rib 9B, and has a baffle rib 9C disposed between the outboard and inboard ribs 9A,9B. The fuel tank 11 may be delimited by other components of the internal frame 7. For example, the fuel tank 11 may be defined by fore/aft boundary walls provided by the front and rear spars 8A,8B. The baffle rib 9C may have holes extending through the baffle rib 9C to allow for the passage of fuel within the fuel tank 11 through the baffle rib 9C. The baffle rib 9C may have additional holes to allow for systems penetration and support. The baffle rib 9C has a first side 12A facing toward the tip 5E of the wing 5, and a second side 12B facing toward the root of the wing 5. Other configurations for the fuel tank 11 are possible and within the scope of the present disclosure. The fuel tank 11 may extend between many different ribs 9, and the wing 5 may also have a dry bay and collector tank between some of the ribs 9. The wing 5 typically has lines or conduits running through it as part of fuel, hydraulics and electrical systems. The lines or conduits run through the wing 5 and are structurally supported by brackets attached to the ribs 9.

Figure 3:
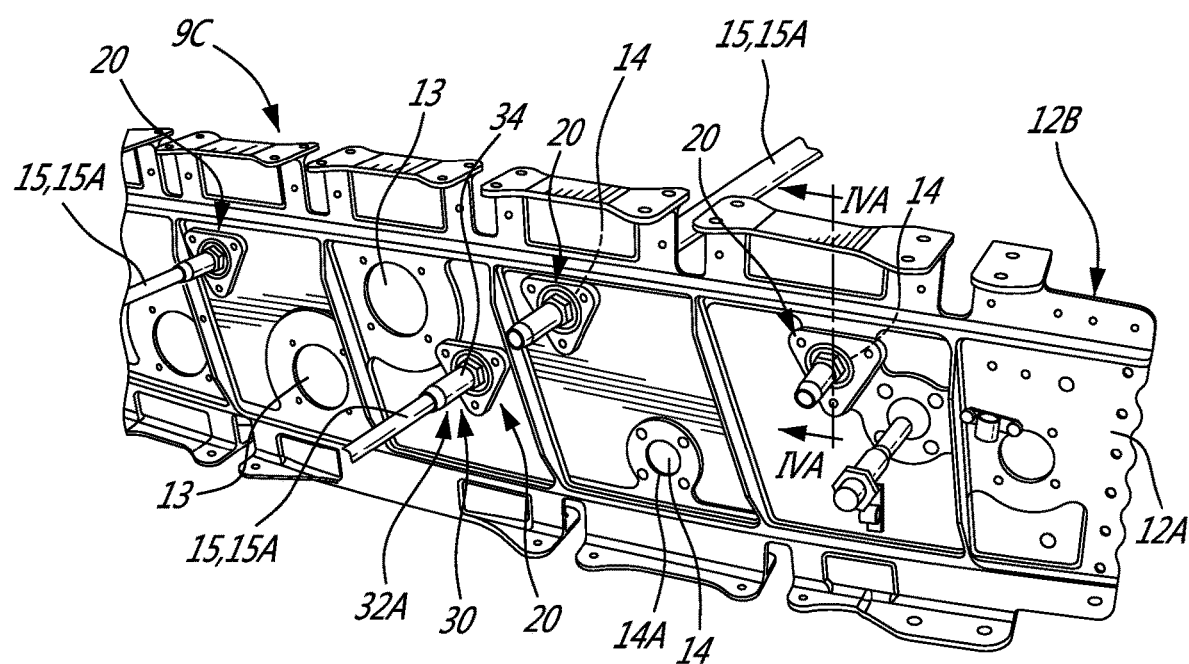
FIG. 3 is a perspective view of one of the ribs shown in FIG. 2, the rib having isolator fittings.

FIG. 3 shows part of the baffle rib 9C in greater detail. The baffle rib 9C is metallic. In the depicted embodiment, the baffle rib 9C is formed from aluminum by machining, although other metal materials or combinations of materials may also be used. The baffle rib 9C has holes 13 which permit the penetration of the lines or conduits of the various systems. The baffle rib 9C has other apertures extending through the baffle rib 9C from the first to second sides 12A,12B. The baffle rib 9C has inner openings 14 extending between the first and second sides 12A,12B. The openings 14 are defined and delimited by an opening wall 14A. The opening wall 14A is positioned in the body of the baffle rib 9C, between upper and lower extremities of the baffle rib 9C.

Isolator fittings 20 are provided in some of the openings 14 of the baffle ribs 9C. Metallic fluid pipes 15 are mounted to the isolator fittings 20 on the first side 12A and the second side 12B of the baffle rib 9C, in order to convey a fluid within the fluid pipes 15 through the baffle rib 9C to some other part of the aircraft 1. As will be better appreciated from the description provided below, each isolator fitting 20 is a component or an assembly that secures the fluid pipes 15 to the baffle rib 9C while electrically isolating the fluid pipes 15 from lightning current extending through the baffle rib 9C and enabling electrostatic discharge from the fluid pipes 15 into the baffle rib 9C. Each isolator fitting 20 helps to break up or interrupt the fluid pipes 15 into metallic fluid pipe segments 15A that are less long, and thus less likely to move during aircraft flight, by providing a fixed point of attachment to the baffle rib 9C. Each isolator fitting 20 also helps to provide electrical insulation to prevent electric charge from being transferred to fuel inside the fuel tank 11, and to the fluid inside the fluid pipes 15. Each isolator fitting 20 also helps to provide a static discharge or dissipation of built-up electrical charges to the baffle rib 9C, and ultimately to the wing 5 and electrical ground of the aircraft 1. Although the openings 14 and the isolator fittings 20 are sometimes described herein in relation to the baffle rib 9C, the openings 14 may be present, and the isolator fittings 20 may be used, on other ribs 9. Therefore, the term "rib 9" will be used herein to generally denote the structure in which the openings 14 are formed, and to which the isolator fittings 20 are attached.

Figure 4A:
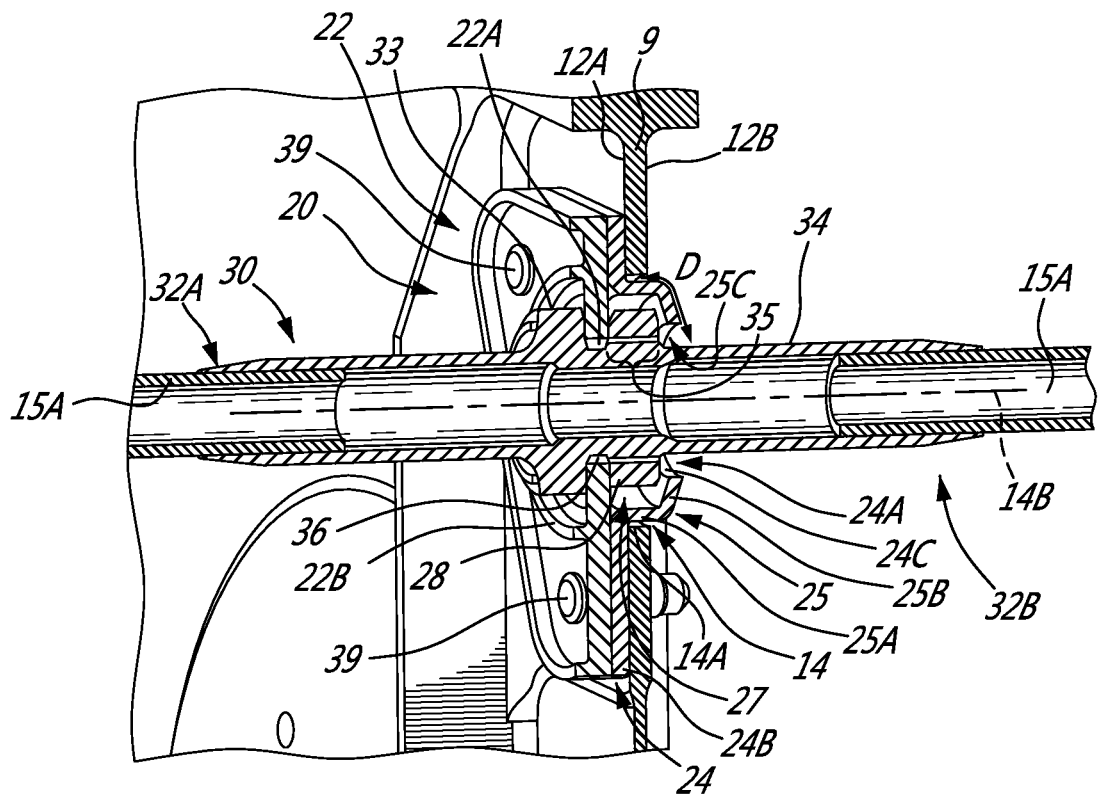
FIG. 4A is a perspective, cross-sectional view of one of the isolator fittings shown in FIG. 3, taken along the line IVA-IVA.
Figure 4B:
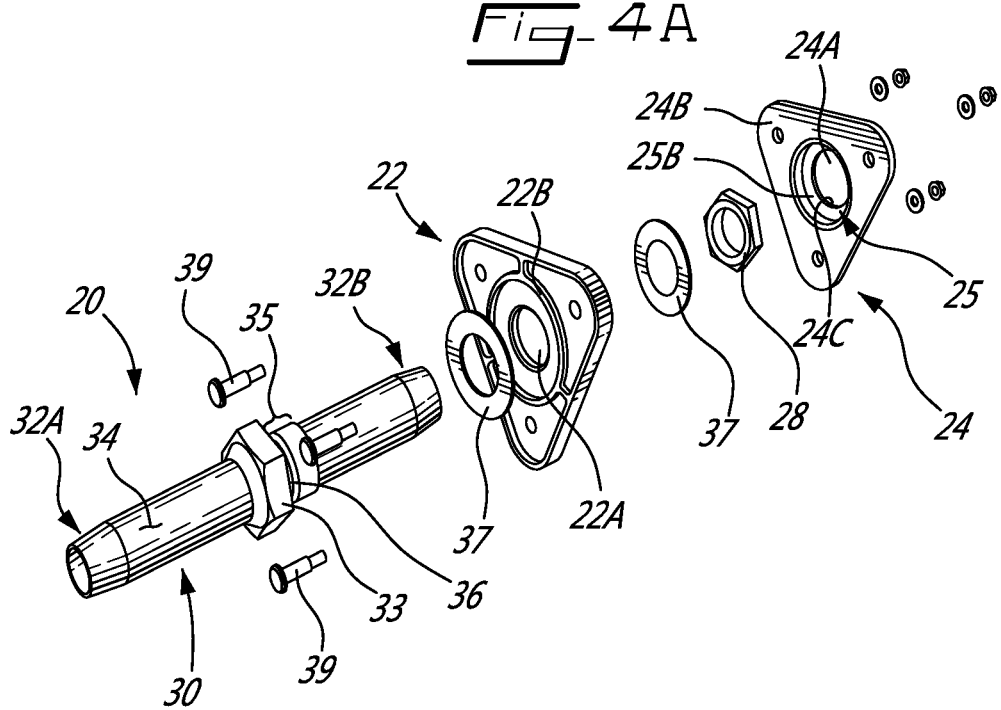
FIG. 4B is an exploded view of the isolator fitting shown in FIG. 4A.

FIGS. 4A and 4B show one of the isolator fittings 20. The isolator fitting 20 includes a first isolator 22 and a second isolator 24. The first isolator 22 is any suitable gasket, bracket, or other mount which helps to attach the isolator fitting 20 to the rib 9, and which helps to electrically insulate components of the isolator fitting 20 from the rib 9, as described in greater detail below. The first isolator 22 is mounted to the rib 9 on its first side 12A. In the depicted embodiment, the first isolator 22 is mounted indirectly to the rib 9, and the second isolator 24 is sandwiched between the first isolator 22 and the first side 12A of the rib 9. In an alternate embodiment, the first isolator 22 is mounted directly to one of the first and second sides 12A,12B of the rib 9. The first isolator 22 has a first isolator opening 22A which is aligned with the opening 14 in the rib 9. In the depicted embodiment, the first isolator opening 22A is substantially coaxial with the opening 14. An axis of the first isolator opening 22A is substantially collinear with an axis 14B of the opening 14 in the rib 9. The first isolator 22 may assume any suitable shape or form to achieve such functionality. In the depicted embodiment, the first isolator 22 is triangular in shape, and the first isolator opening 22A is a substantially central opening. Alternative shapes for the first isolator 22 are also possible.

The second isolator 24 is also any suitable gasket, bracket, or other mount which also helps to electrically insulate components of the isolator fitting 20 from the rib 9. The second isolator 24 is mounted to the rib 9 on its first side 12A. In the depicted embodiment, the second isolator 24 is mounted directly to the first side 12A of the rib 9. The second isolator 24 is therefore mounted to the same first side 12A of the rib 9 as the first isolator 22. In an alternate embodiment, the second isolator 24 is mounted directly to the second side 12B of the rib 9.

The second isolator 24 has a nut housing segment 25. The nut housing segment 25 is a portion of the second isolator 24 which encloses and houses a metallic nut 28 when installed. As will be described in greater detail below, the nut housing segment 25 provides a barrier between the nut 28 and the opening wall 14A of the rib 9 to help electrically insulate the nut 28 from an electrical discharge emanating from the rib 9. The nut housing segment 25 has a second isolator opening 24A which is substantially aligned with the opening 14 in the rib 9, and with the first isolator opening 22A. In the depicted embodiment, the second isolator opening 24A is substantially coaxial with the opening 14. An axis of the second isolator opening 24A is substantially collinear with the axis 14B of the opening 14 in the rib 9. The second isolator 24 may assume any suitable shape or form to achieve the functionality ascribed thereto herein. In the depicted embodiment, the second isolator 24 is triangular in shape, and the second isolator opening 24A is a substantially central opening. Alternative shapes for the second isolator 24 are also possible.

Still referring to FIGS. 4A and 4B, the isolator fitting 20 also includes a conduit 30. The conduit 30 is a hollow pipe or tube. The conduit 30 is a metallic component in the depicted embodiment, and is a hydraulic bulkhead connector. The conduit 30 is made from a corrosion-resistant steel (ORES) or aluminum alloy. The conduit 30 made from ORES may be anodized and passivated. The conduit 30 made from aluminum is chemical film treated. The conduit 30 is non-metallic or composite in an alternate embodiment. The fluid pipe segments 15A are mounted to opposite first and second ends 32A,32B of the conduit 30. The conduit 30 is externally swaged to the fluid pipe segments 15A in the depicted embodiment. The conduit 30 helps to convey fluid between the fluid pipe segments 15A. In the depicted embodiment, the first end 32A of the conduit 30 is located on the first side 12A of the rib 9, and the second end 32B of the conduit 30 is located on the second side 12B of the rib 9. The conduit 30 has an axis which is co-linear with the axis 14B of the opening 14 in the rib 9, and with the axes of the first and second isolator openings 22A,24A. The conduit 30 has an axis which is co-linear with the axes of the pipe segments 15A.

The conduit 30 is a separate component from the first and second isolators 22,24. The conduit 30 is mounted to the first isolator 22 and is thus supported from the rib 9 because the first isolator 22 is itself mounted to the rib 9. Many configurations for mounting the conduit 30 to the first isolator 22 are possible and within the scope of the present disclosure. In FIG. 4A, for example, the conduit 30 has a permanent nut 33 secured to an outer surface 34 of the conduit 30. The permanent nut 33 is fixed in place on the outer surface 34 of the conduit 30, and does not displace relative to an axis of the conduit 30. The permanent nut 33 protrudes radially outwardly (i.e. away from the axis 14B of the opening 14) from the outer surface 34. The conduit 30 also has a threaded segment 35 extending along a length of the outer surface 34. The threaded segment 35 is spaced apart in an axial direction from the permanent nut 33 to define an isolator gap 36. The isolator gap 36 is configured to receive a portion of the first isolator 22.

To mount the conduit 30 to the first isolator 22, and thus to the rib 9, the conduit 30 is inserted through the first isolator opening 22A in order to position a radially-inner portion (i.e. closer to the axis 14B of the opening 14) of the first isolator 22 in the isolator gap 36. The nut 28 is then tightened along the threaded segment 35 of the conduit 30 until it abuts against the radially-inner portion of the first isolator 22. The nut 28 secures the radially-inner portion of the first isolator 22 in the isolator gap 36, and "jams" the radially-inner portion of the first isolator 22 against the permanent nut 33, thereby securing the conduit 30 to the first isolator 22. Once the nut 28 is installed, the second isolator 24 is then slid over the second end 32B of the conduit 30. The first and second isolators 22,24 are placed against the first side 12A of the rib 9 such that the second isolator 24 is sandwiched between the first isolator 22 and the first side 12A of the rib 9. Then, both the first and second isolators 22,24 are secured to the rib 9 with fasteners 39, thereby allowing the conduit 30 to be supported from the rib 9. In the depicted embodiment, and as shown in FIG. 4B, washers 37 are positioned between the permanent nut 33 and the radially-inner portion of the first isolator 22, and between the nut 28 and the radially-inner portion of the first isolator 22, to further improve the frictional engagement of the nut 28 with the radially-inner portion of the first isolator 22. On one of its sides, the first isolator 22 includes a washer rib 22B to circumscribe the washer 37 in the depicted embodiment.

The first isolator 22 is made from a first material, and the second isolator 24 is made from a second material. The first material and the second material function to impede or prevent the conductance of electricity from the rib 9 through the first and second isolators 22,24, to the conduit 30, and to the fluid pipe segments 15A. The electrical resistance of the first material and the second material is greater than the electrical resistance of the metallic conduit 30. The electrical resistance of the first material and of the second material is also greater than the electrical resistance of the rib 9 and of the fluid pipe segments 15A. The first and second materials are configured to electrically insulate the metallic conduit 30 from the rib 9 to prevent the conductance of electrical current thereto. The first and second materials are also configured to slowly discharge or dissipate an electrical charge to the rib 9, as described in greater detail below. The first and second materials therefore provide electrical insulation for relatively high voltage, high current lightning strikes, but are still electrically conductive for relatively low voltage, low current electrostatic charge build up. According to a specific embodiment, the first and second materials are the same. The first material and the second material have approximately the same electrical resistance value, where the electrical resistance value is typically measured in ohms (0). In an alternate embodiment, the first material and the second material may be different and have different electrical resistance values. In such an alternate embodiment, the electrical resistance value of one of the first material and the second material is less than the electrical resistance value of the other material.

In the depicted embodiment, the first material and the second material have the same base material. The first material and the second material are both made from polyetheretherketone (PEEK). PEEK is normally not electrically-conductive, but may be made more conductive if desired. PEEK may therefore be used because it is non-conductive, but still able to discharge electrostatic build-up. In some embodiments, the PEEK of the first and second materials may be made more conductive in order to impart some conductivity to the first and second materials of the first isolator 22 and the second isolator 24, respectively. In such a situation, a conductive additive may be added to the non-conductive PEEK to provide enhanced electrical conductivity, or to control the electrical resistance from the conduit 30 to the rib 9 via the first and second isolators 22,24 so that the electrical resistance is within a permissible range. Some non-limiting examples of conductive additives for the PEEK include ground metal particles, carbon black, or other suitable conductive matter. The enhanced electrical conductivity of the first and second isolators 22,24 may allow an electrostatic charge to be dissipated through the first and second materials, into the rib 9, and onwards to the electrical ground of the aircraft 1. Another possibility for the first and second materials includes polyphenylene sulfide (PPS). In the depicted embodiment, the first and second materials have the same concentration of conductive additives, such that the first material and the second material have approximately the same electrical resistance value.

In an alternate embodiment, the first material and the second material are made from different base materials. In another alternate embodiment, the PEEK of the first material is made more conductive than the PEEK of the second material in order to impart more conductivity to the first material of the first isolator 22 than to the second material of the second isolator 24. In such an embodiment, the conductive additive is added to the non-conductive PEEK to provide enhanced electrical conductivity, or to control the electrical resistance from the conduit 30 to the rib 9 via the first isolator 22 so that the electrical resistance is within a permissible range. In this alternate embodiment, the electrical resistance value of the first material is less than the electrical resistance value of the second material.

Referring to FIG. 4A, when mounted to the rib 9, the conduit 30 extends through the opening 14 of the rib 9, and also extends through the first and second isolator openings 22A,24A. After the nut 28 has been tightened against the radially-inner portion of the first isolator 22, the second isolator 24 is placed over the second end 32B of the conduit 30 such that the nut 28 is disposed within the nut housing segment 25 of the second isolator 24. The nut housing segment 25 in the depicted embodiment is made from the same second material as the rest of the second isolator 24. The nut housing segment 25 at least partially encloses the nut 28, and the nut housing segment 25 is positioned between the nut 28 and the opening wall 14A of the rib 9. When mounted to the rib 9, the isolator fitting 20 helps to define a tracking distance D. The tracking distance D is the distance separating the rib 9 from an electrically-conductive component, such as the metallic nut 28 or the metallic conduit 30. The tracking distance D helps to electrically insulate the nut 28 and the conduit 30, and the fluid pipe segments 15A mounted thereto as well as their fluid contents, from electrical discharges emanating from the rib 9, such as for example during a lightning strike on the wing 5. By spacing the metallic conduit 30 apart from the metallic rib 9 across the tracking distance D, and by shielding the nut 28 with the electrically-insulating second material of the nut housing segment 25, the isolator fitting 20 helps to decrease the likelihood that an electrical spark or discharge will be conveyed from the opening wall 14A of the metallic rib 9 to the metallic conduit 30. The isolator fitting 20 therefore helps to provide electrical isolation of metallic fluid pipes 15 from the metallic wing ribs 9, thereby helping to improve lightning strike protection for the fuel tank 11.

Still referring to FIG. 4A, the tracking distance D is defined between the outer surface 34 of the conduit 30 and the opening wall 14A of the metallic rib 9. The presence of the electrically-insulating nut housing segment 25 contributes to increasing the tracking distance D by forming an electrically-insulating barrier between the nut 28 and the opening wall 14A. If the nut housing segment 25 were not present to shield the nut 28, the tracking distance D would be smaller, and an electrical discharge from the rib 9 would have a much smaller distance to jump or arc across the opening 14 in the rib 9 to impact the conduit 30.

Different configurations of the second isolator 24 and its nut housing segment 25 are possible to achieve the electrical isolation effect described above. One such configuration is shown in FIG. 4A, where the second isolator 24 includes a flange segment 24B which extends radially outwardly from the nut housing segment 25. The flange segment 24B is mounted to the first side 12A of the rib 9, and is sandwiched between one side of the first isolator 22 and the rib 9. The nut 28 is also abutted against the same side of the first isolator 22 as the flange segment 24B. The nut housing segment 25 has an axial portion 25A which is substantially aligned with the axis 14B of the opening 14 in the rib 9, and with the axis of the second isolator opening 24A. The axial portion 25A is positioned in the opening 14 of the rib 9. The axial portion 25A is transverse to the flange segment 24B. The axial portion 25A extends in a direction parallel to the axis 14B from the flange segment 24B, and is positioned between the nut 28 and the opening wall 14A of the rib 9 to shield the nut 28 as described above. The nut housing segment 25 also has a radial portion 25B which has an orientation being substantially radial to the axis 14B of the opening 14, and to the axis of the second isolator opening 24A. The radial portion 25B is transverse to the axial portion 25A, and is parallel to the flange segment 24B. The radial portion 25B extends from the axial portion 25A along a radial direction toward the conduit 30 to a distal end 25C of the nut housing segment 25. The distal end 25C has a second applicator opening wall 24C which delimits and defines the second applicator opening 24A. The radial portion 25B of the nut housing segment 25 helps to block migration of the nut 28 in a direction parallel to the axis 14B along the outer surface 34 of the conduit 30. The radial portion 25B helps to prevent rotation of the nut 28 about the outer surface 34 which might cause loosening of the nut 28 and affect the mounting of the conduit 30 to the first isolator 22. The axial portion 25A forms an electrically-insulating barrier between the nut 28 and the opening wall 14A of the rib 9. It will therefore be appreciated that the second isolator 22 is a PEEK fitting which helps to provide tracking protection between the fluid pipe segments 15A and the metallic rib 9, and also helps to provide secondary locking features to prevent the nut 28 from loosening.

Still referring to FIG. 4A, a gap 27 is defined between the opening wall 14A of the rib 9 and the nut 28. The gap 27 has an annular shape which has a radially-inner boundary defined by the surface of the nut 28, and a radially-outer boundary defined by the opening wall 14A. The nut housing segment 25, and in particular the axial portion 25A thereof, is disposed within the gap 27. The axial portion 25A of the nut housing segment 25 is spaced apart from both the opening wall 14A and the nut 28. The presence of the gap 27 helps to increase the tracking distance D between the opening wall 14A and the outer surface 34 of the conduit 30, and thus helps to further electrically insulate the metallic conduit 30 from the metallic rib 9. In the depicted embodiment, the tracking distance D is the combined length of the following segments: a first segment starting at the opening wall 14A to the radially-outer surface of the axial portion 25A, a second segment along the radially-outer surface of the axial portion 25A, a third segment along an outer surface of the radial portion 25B to the second applicator opening wall 24C, and a fourth segment from the second applicator opening wall 24C to the outer surface 34 of the conduit 30. The tracking distance D includes the gap 27. The tracking distance D is greater than a thickness of the gap 27. In the depicted embodiment, the tracking distance D is at least 0.5 inches.

Still referring to FIGS. 4A and 4B, the first and second isolators 22,24 also help to space the fasteners 39, which secure the first and second isolators 22,24 to the rib 9, from another metal component such as the nut 28, the conduit 30 or the rib 9 itself. In the depicted embodiment, the first and second isolators 22,24 have a triangular shape, and the fasteners 39 extend through the first and second isolators 22,24 at the corners of the triangular first and second isolators 22,24. The fasteners 39 are therefore spaced apart an appropriate tracking distance D from the permanent nut 33, the nut 28, the outer surface 34 of the conduit 30, and the metallic surface of the rib 9, such that the first and second isolators 22,24 contribute to providing an adequate tracking distance D between the fasteners 39 and another metal component.

Figure 4C:
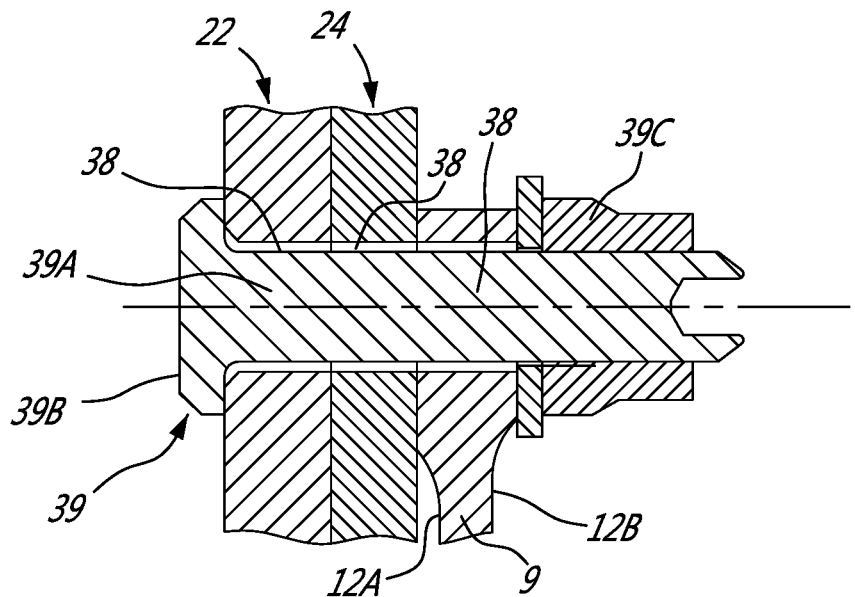
FIG. 4C is a cross-sectional view of a fastener of the isolator fitting of FIG. 4A.

Referring to FIG. 4C, each of the rib 9, the first isolator 22, and the second isolator 24 have aligned fastener openings 38. The fastener openings 38 are through passages in the rib 9 and the first and second isolators 22,24 that are configured to receive the fasteners 39 to mount the first and second isolators 22,24 to the rib 9. Each of the first and second isolators 22,24 has three fastener openings 38 in the depicted embodiment (see FIGS. 4A and 4B), although more or fewer fastener openings 38 are possible. The fastener openings 38 are separate and distinct from the opening 14, and from the first and second isolator openings 22A,24A, and the fastener openings 38 are spaced apart therefrom. Each fastener 39 extends through the aligned fastener openings 38 between the first and second sides 12A,12B of the rib 9. Each fastener 39 in FIG. 4C is a bolt with a metallic shaft 39A, a metallic head 39B, and a metallic nut 39C. The metallic head 39B is abutted against one side of the first isolator 22 on the first side 12A of the rib 9, and the metallic nut 39C is abutted against the second side 12B of the rib 9.

In the depicted embodiment, the first and second isolators 22,24 are configured to dissipate electrical charge into the rib 9 through a conductive path defined along the fasteners 39. An ignition risk within aircraft fuel tanks 11 is electrostatic discharge. As fuel is pumped into the fuel tank 11, the surface of the fuel may become charged, and this charge could accumulate on the fluid pipes 15, either by direct contact with the fuel or by inducing voltage in the fluid pipes 15 across an air gap. The rib 9 is configured to provide multiple paths for this charge to dissipate. As explained above, a conductive additive is added to the non-conductive PEEK of the first and second materials of the first and second isolators 22,24 to provide enhanced electrical conductivity to the first and second isolators 22,24. The concentration of the conductive additive in the first and second materials is selected so that the path of least electrical resistance between the outer surface 34 of the conduit 30 and the rib 9 has a resistance below a maximum resistance value (to ensure that current can flow between the fluid pipes 15 and the rib 9 via the first and second isolators 22,24 and the fasteners 39 to dissipate any electrostatic charges) and above a minimum resistance value (to ensure that the first and second isolators 22,24 still provide sufficient electrical insulation against a lighting strike). The charge being dissipated through the first isolator 22, the second isolator 24, and the fasteners 39 slowly flows back into the rib 9 and into the ground path of the wing 5.

Figure 4D:
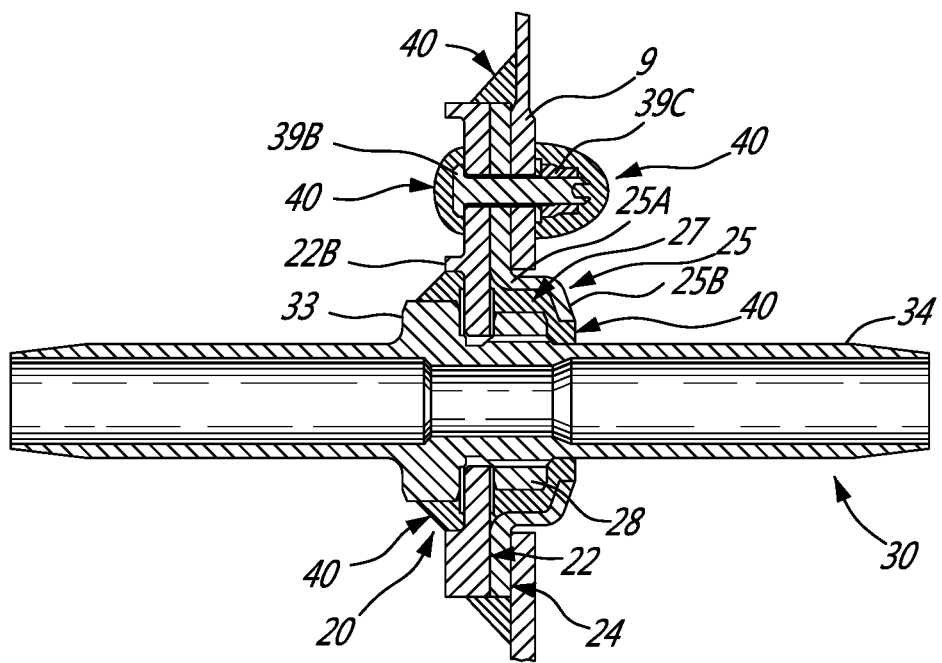
FIG. 4D is another cross-sectional view of the isolator fitting of FIG. 4A, shown with a sealant.

FIG. 4D is another cross-sectional view of the rib 9 and the isolator fitting 20. A sealant 40 is applied over some of the components of the isolator fitting 20. The sealant 40 helps to plug gaps between the isolator fitting 20 and the rib 9 to make the mounting of the isolator fitting 20 impermeable to fuel within the fuel tank 11. For example, the sealant 40 is applied as a fillet seal between the rib 9 and the first and second isolators 22,24, over the metallic head 39B of the fastener 39, between the washer rib 22B and the permanent nut 33, and over the metallic nut 39C. The sealant 40 is also disposed in the gap 27 between the nut housing segment 25 and the nut 28, and in this location may help prevent or reduce rotational loosening of the nut 28. The sealant 40 is disposed between the axial and radial portions 25A,25B of the nut housing segment 25, and the outer surface 34 and nut 28. The sealant 40 may be an aerospace grade, fuel tank sealant. In the depicted embodiment, the sealant 40 is electrically non-conductive and may contribute to preventing spark ignition. The sealant 40 also has resistive properties to the fuel in the fuel tank 11. Examples of a suitable sealant 40 include AC-370 Aerospace Sealant commercialised by 3M™, and PR-1776M Class B Low Weight Fuel Tank Sealant commercialised by PPG™. The sealant 40 may also help with corrosion protection.

Figures 5A, 5B:
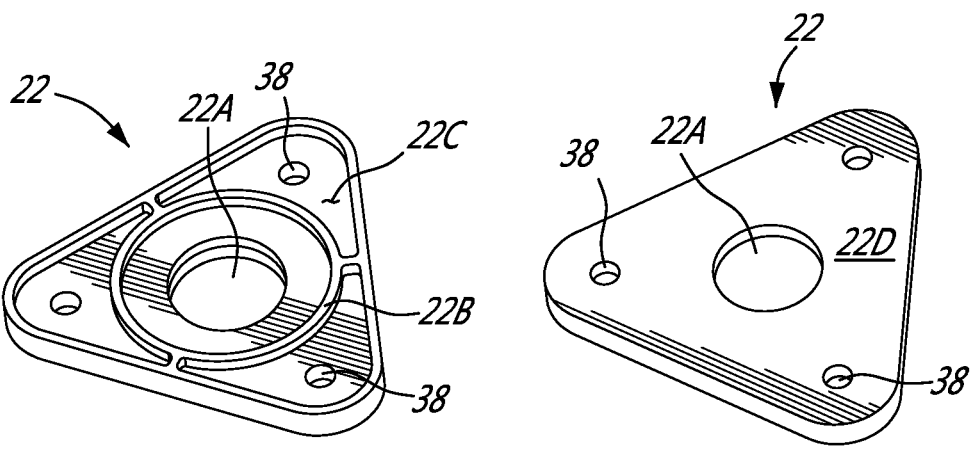
FIG. 5A is a perspective view of a first isolator of the isolator fitting of FIG. 4A.
FIG. 5B is another perspective view of the first isolator of FIG. 5A.

FIG. 5A shows the first isolator 22 from a first side 22C, and FIG. 5B shows the first isolator 22 from a second side 22D. In the depicted embodiment, the first isolator 22 is triangular in shape, and the first isolator opening 22A is a central opening. On the first side 22C, the washer rib 22B is configured to circumscribe the washer 37. The fastener openings 38 are through passages between the first and second sides 22C,22D of the first isolator 22.

Figures 6A, 6B:
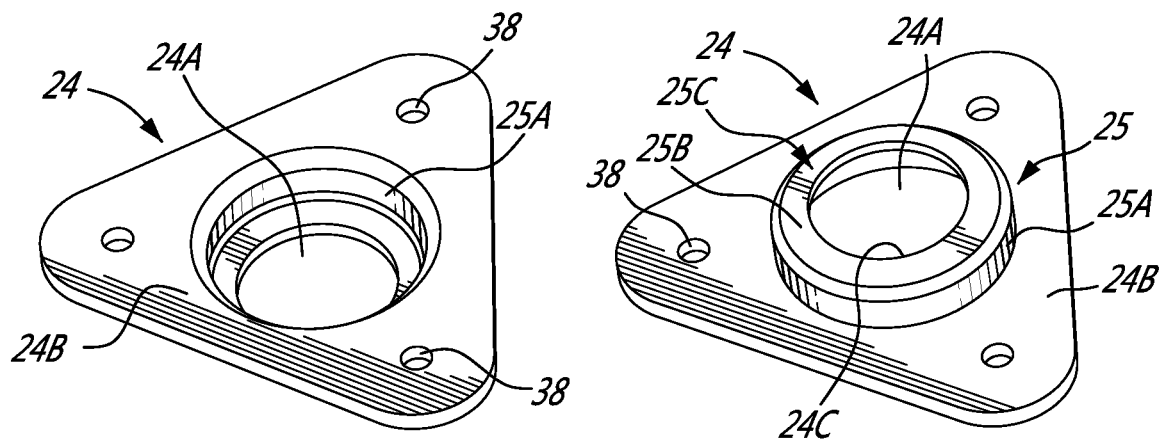
FIG. 6A is a perspective view of a second isolator of the isolator fitting of FIG. 4A.
FIG. 6B is another perspective view of the second isolator of FIG. 6A.

FIGS. 6A and 6B show the second isolator 24 from both sides. In the depicted embodiment, the second isolator 24 is triangular in shape, and the second isolator opening 24A is a central opening. The flange segment 24B extends radially outwardly from the axial portion 25A of the nut housing segment 25. The axial portion 25A extends to the radial portion 25B. The radial portion 25B extends from the axial portion 25A along a radial direction toward the distal end 25C and the second applicator opening wall 24C. The fastener openings 38 are through passages through the second isolator 24.

Figure 7:
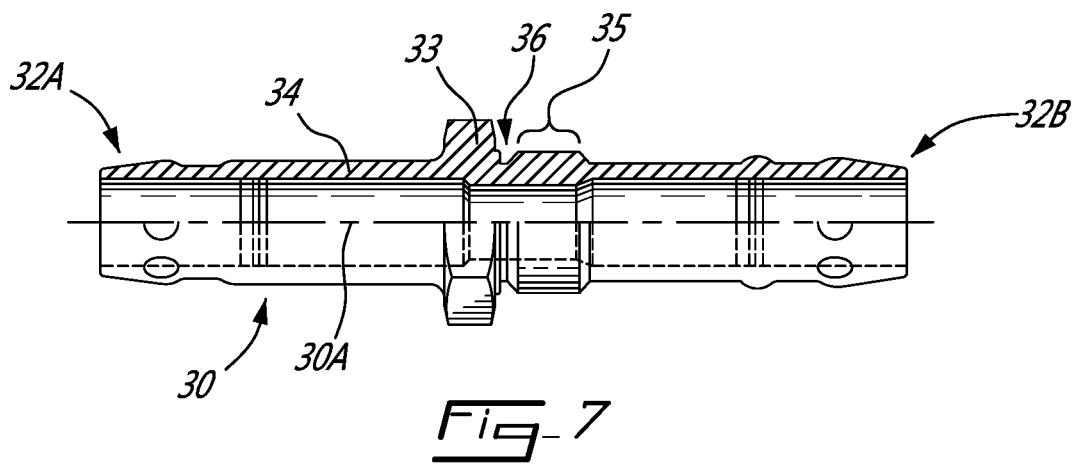
FIG. 7 is a perspective view of a conduit of the isolator fitting of FIG. 4A.

FIG. 7 shows the conduit 30 extending between its first and second ends 32A,32B. The permanent nut 33 is secured to the outer surface 34 of the conduit 30. The permanent nut 33 is fixed in place on the outer surface 34 of the conduit 30, and does not displace relative to an axis 30A of the conduit 30. The threaded segment 35 is spaced apart in a direction along the axis 30A from the permanent nut 33 to define the isolator gap 36.

Figure 8:
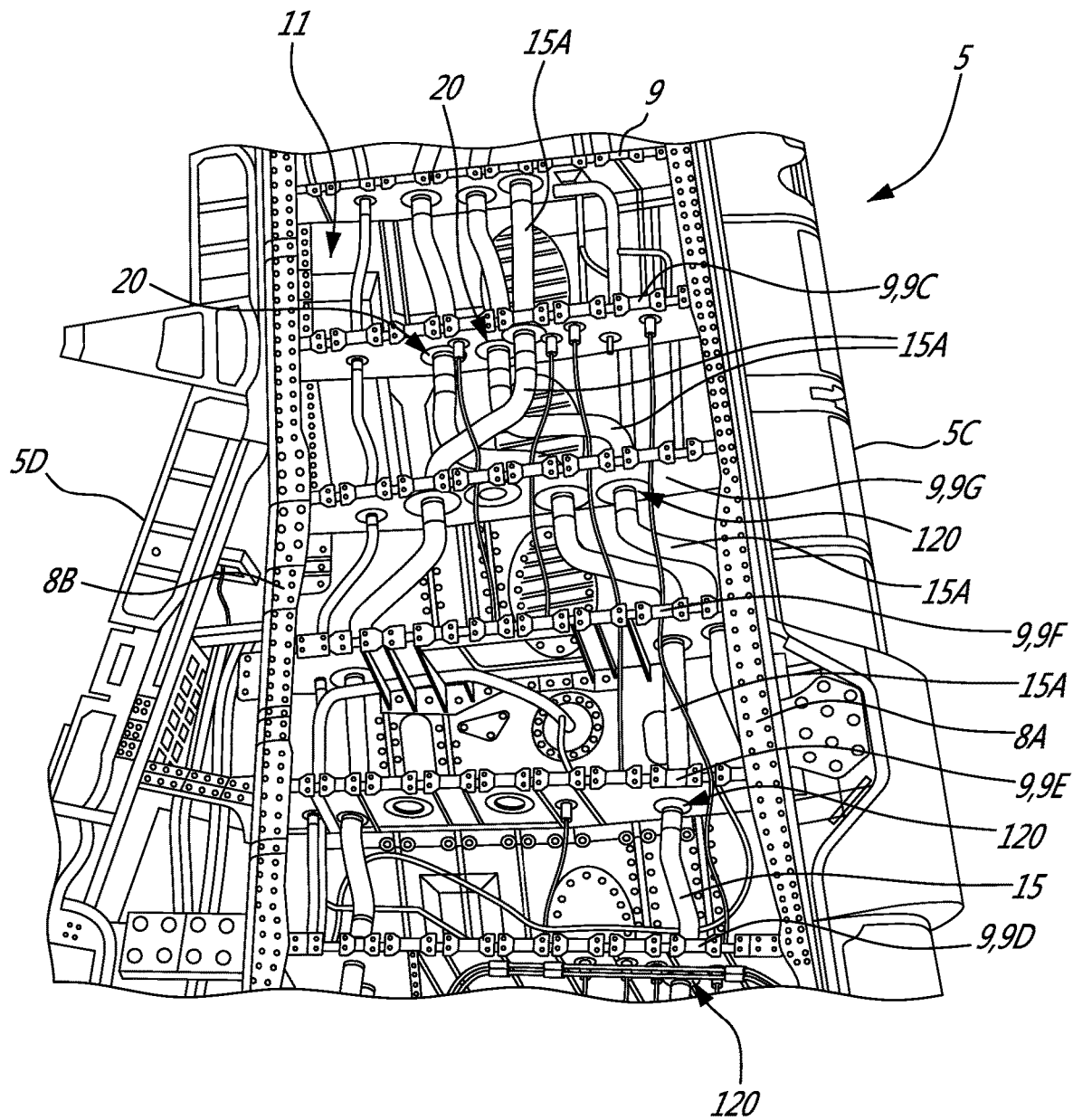
FIG. 8 is a top view of a wing of the aircraft shown in FIG. 1, showing a fuel tank, ribs, and fluid pipes.

Referring to FIG. 8, an interior of the wing 5 is shown. The fuel tank 11 is defined between multiple ribs 9, including the baffle rib 9C. The ribs 9 extend between the leading and trailing edges 5C,5D of the wing 5, and are mounted to the front and aft spars 8A,8B. The wing 5 includes a plurality of the fluid pipe segments 15A. One of the fluid pipe segments 15A is mounted to the first end 32A of the conduit 30 on the first side 12A of the baffle rib 9C (see FIG. 3). Another one of the fluid pipe segments 15A is mounted to the second end 32B of the conduit 30 on the second side 12B of the baffle rib 9C. The fluid pipe 15 is collectively defined by its fluid pipe segments 15A, and extends between the ribs 9. At least two of the fluid pipe segments 15A are mounted to the baffle rib 9C with the isolator fitting 20 disclosed herein. For the remainder of the ribs 9, the fluid pipe segments 15A are mounted thereto with other types of fittings, such as a moveable isolating bracket 120 that do not fix the pipe segments 15A to the rib 9 and instead permit the pipe segments 15A to move relative to the rib 9. The wing 5 is thus provided with an arrangement of fittings 20,120 for mounting the fluid pipe segments 15A to the ribs 9. In FIG. 8, the arrangement of fittings 20,120 includes a fixed metallic bracket 120 at the rib 9D, three movable isolating brackets 120 at each of the ribs 9E,9F,9G, and the fixed isolator fitting 20 at the baffle rib 9C. This configuration of the fittings 20,120 results in the elimination of a path for electrical current along the fluid pipe 15 between at least three ribs 9, because one of the ribs 9 (e.g. the baffle rib 9C in the depicted embodiment) is electrically isolated. Other arrangements of the fittings 20,120 are possible and within the scope of the present disclosure.

Figure 9A:
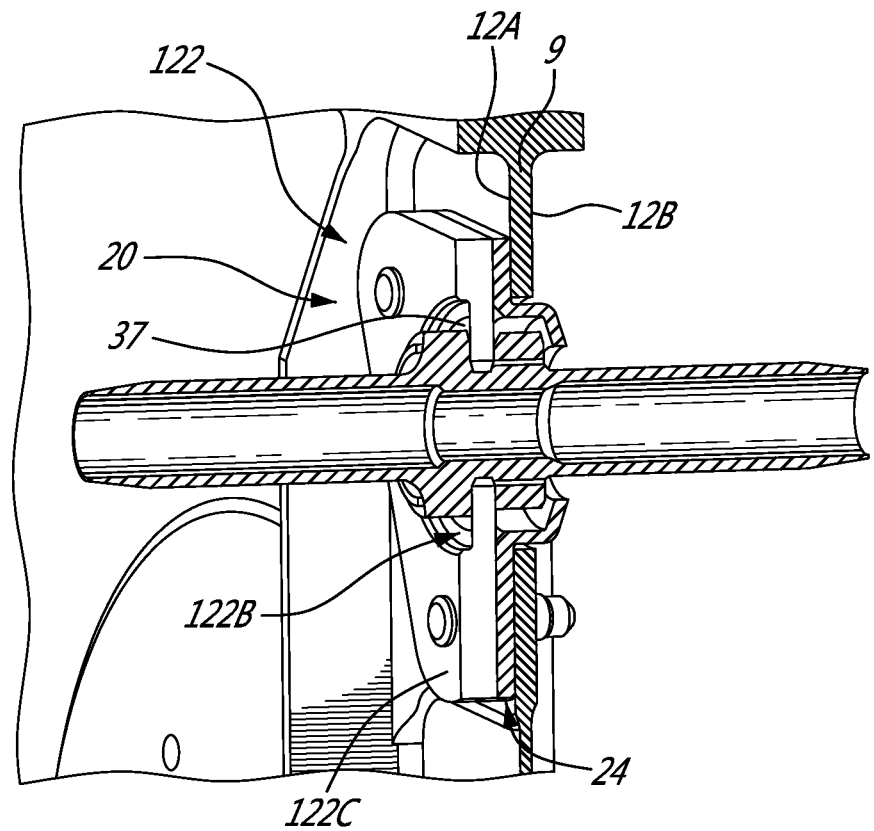
FIG. 9A is a perspective, cross-sectional view of an isolator fitting having a first isolator according to another embodiment of the present disclosure.
Figure 9B:
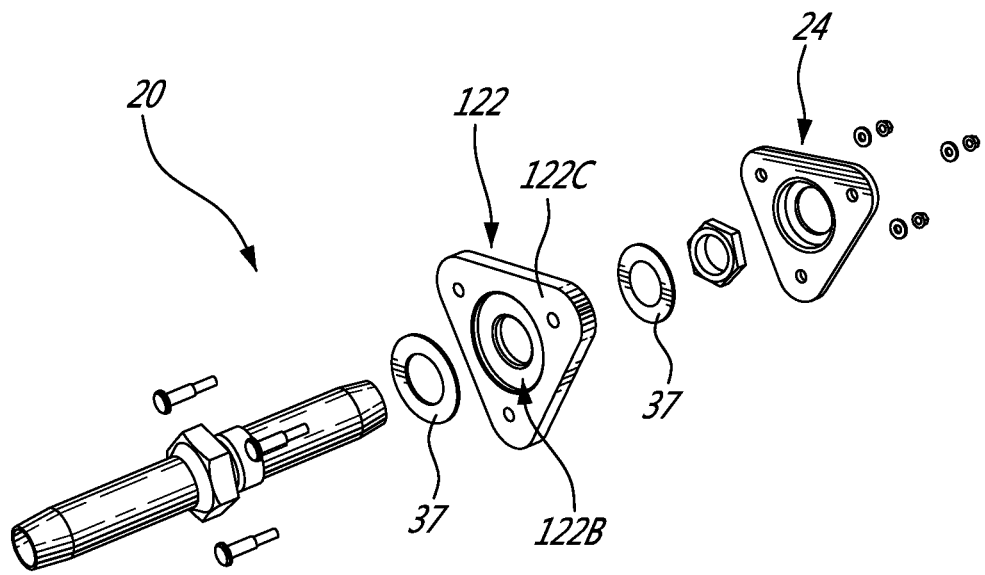
FIG. 9B is an exploded view of the isolator fitting shown in FIG. 9A.

FIGS. 9A and 9B show another embodiment of the first isolator 122. The first isolator 122 does not include a washer rib 22B. The first isolator 122 includes a washer recess 122B which extends inwardly from the first side 122C of the first isolator 122. The washer recess 122B is configured to receive therein one of the washers 37 and to circumscribe the washer 37.

Referring to FIG. 4A, there is also disclosed a method of electrically insulating and supporting the fluid pipe 15 from the metallic rib 9. The method includes: mounting the first isolator 22 about the conduit 30 to extend the conduit 30 through the first isolator opening 22A. The method also includes securing the first isolator 22 to the conduit 30 by tightening the nut 28 about the outer surface 34 of the conduit 30 to abut against the first isolator 22. The method also includes mounting the second isolator 24 about the conduit 30 to at least partially enclose the nut 28 such that the nut 28 is housed within a segment, such as the nut housing segment 25, of the second isolator 24. The method also includes securing the first and second isolators 22,24 to the metallic rib 9 to support the conduit 30, such that the conduit 30 extends through the opening 14 in the metallic rib 9 and through the first and second isolator openings 22A, 24A. The method also includes mounting the fluid pipe 15 to the conduit 30. The method may include arresting sliding movement of the conduit 30 along a direction parallel to the axis 14B of the opening 14. This may be achieved from the mounting of the conduit 30 to the first isolator 22, which reduces or prevents a sliding axial relative movement between the conduit 30 and the rib 9. A rotational movement of the conduit 30 about the axis 14B of the opening 14 is also prevented by engagement of the nut 28 with the radial portion 25B of the nut housing segment 25.

In light of the preceding, it will be appreciated that the components of the isolator fitting 20 are relatively inexpensive, relatively easy to source, and relatively easy to assembly to mount the isolator fitting 20 to the rib 9. The size of some of the components of the isolator fitting 20, such as the first and second isolator openings 22A,24A, may be modified to cater to different diameters of fluid pipe segments 15A.

The above description is meant to be exemplary only, and one skilled in the art will recognize that changes may be made to the embodiments described without departing from the scope of the invention disclosed. For example, although the isolator fitting 20 is disclosed herein being mounted to the rib 9 of an aircraft wing 5, it will be appreciated that the isolator fitting 20 may be mounted to other components and structures to support and electrically insulate fluid tubing. Therefore, the present disclosure does not limit the isolator fitting 20 to being used only with ribs 9 of an aircraft wing 5. Still other modifications which fall within the scope of the present invention will be apparent to those skilled in the art, in light of a review of this disclosure, and such modifications are intended to fall within the appended claims.

The invention claimed is:

1. An aircraft wing, comprising:
a fuel tank defined between ribs and a skin of the wing, at least one of the ribs being metallic and defining a first side and a second side, the at least one rib having an opening wall delimiting an opening in the at least one rib extending between the first and second sides; and
an isolator fitting, comprising;
a first isolator mounted to the at least one rib and having a first isolator opening;
a second isolator mounted to the at least one rib and having a nut housing segment defining a second isolator opening; and
a conduit extending between a first end and a second end, and a nut mounted about an outer surface of the conduit and abutted against the first isolator, the conduit extending through the opening of the at least one rib and through the first and second isolator openings, the nut disposed within the nut housing segment of the second isolator to position the nut housing segment between the nut and the opening wall of the at least one rib, a tracking distance being defined between the outer surface of the conduit and the opening wall to electrically insulate the conduit from the at least one rib.

2. The aircraft wing as defined in claim 1, wherein the second isolator abuts against the first side of the at least one rib, and the first isolator abuts against the second isolator on the first side of the at least one rib.

3. The aircraft wing as defined in claim 1, wherein a gap is defined between the opening wall of the at least one rib and the nut, the nut housing segment of the second isolator being disposed within the gap and spaced apart from both the opening wall and the nut.

4. The aircraft wing as defined in claim 3, wherein a sealant is disposed in the gap between the nut housing segment and the nut.

5. The aircraft wing as defined in claim 1, wherein the second isolator includes a flange segment extending outwardly from the nut housing segment and mounted to the at least one rib, the nut housing segment having an axial portion extending from the flange segment and being positioned in the opening between the nut and the opening wall of the at least one rib, the nut housing segment having a radial portion extending from the axial portion to a distal end having a second applicator opening wall delimiting the second applicator opening.

6. The aircraft wing as defined in claim 5, wherein the tracking distance is defined along at least a surface defined by the axial portion and the radial portion.

7. The aircraft wing as defined in claim 5, wherein the flange segment of the second isolator is disposed between the first isolator and the first side of the at least one rib, the flange segment abutting against a first side of the first isolator and the nut abutting against the first side of the first isolator.

8. The aircraft wing as defined in claim 1, wherein the conduit is metallic and has a permanent nut fixedly attached to the outer surface and a threaded segment extending along a length of the outer surface, the nut mounted to the threaded segment and spaced apart from the permanent nut to define an isolator gap, a portion of the first isolator being positioned in the isolator gap between the nut and the permanent nut.

9. The aircraft wing as defined in claim 1, further comprising a plurality of fluid pipe segments, one of the fluid pipe segments being mounted to the outer surface of the first end of the conduit on the first side of the at least one rib, and another one of the fluid pipe segments being mounted to the outer surface of the second end of the conduit on the second side of the at least one rib.

10. The aircraft wing as defined in claim 1, wherein the first isolator and the second isolator are configured to dissipate electrical charge into the at least one rib.

11. The aircraft wing as defined in claim 1, wherein the at least one rib and the first and second isolators include aligned fastener openings spaced apart from the opening of the at least one rib, and the isolator fitting further comprises fasteners extending through the aligned fastener openings between the first and second sides of the at least one rib.

12. The aircraft wing as defined in claim 1, wherein the at least one rib is a baffle rib, the aircraft wing further comprising a fluid pipe extending between the ribs, the fluid pipe being mounted to the baffle rib with the isolator fitting, the fluid pipe being mounted to at least another one of ribs with a moveable isolating bracket.

13. The aircraft wing as defined in claim 1, wherein the first and second isolators are made of polyetheretherketone.

14. The aircraft wing as defined in claim 1, wherein the tracking distance is at least 0.5 inches.

15. An isolator fitting positionable about an opening in a metallic rib of an aircraft wing, the isolator fitting comprising:
 a first isolator mountable to the rib to position a first isolator opening in alignment with the opening of the rib;
 a second isolator mountable to the rib and having a nut housing segment defining a second isolator opening to be positioned in alignment with the opening of the rib; and
 a conduit extending between a first end and a second end, and a nut mountable about an outer surface of the conduit to abut against the first isolator and mount the conduit thereto, the conduit being positionable to extend through the opening of the rib and through the first and second isolator openings to position the nut within the nut housing segment of the second isolator such that the nut housing segment is positioned between the nut and the rib.

16. The isolator fitting as defined in claim 15, wherein the second isolator is abuttable against a first side of the rib, and the first isolator is abuttable against the second isolator on the first side of the rib.

17. The isolator fitting as defined in claim 15, wherein the second isolator includes a flange segment extending outwardly from the nut housing segment and mountable to the rib, the nut housing segment having an axial portion extending from the flange segment and being positionable between the nut and the opening of the rib, the nut housing segment having a radial portion extending from the axial portion to a distal end having a second applicator opening wall delimiting the second applicator opening.

18. The isolator fitting as defined in claim 17, wherein the flange segment of the second isolator is positionable between the first isolator and a first side of the rib, the flange segment being abuttable against a first side of the first isolator, and the nut being abuttable against the first side of the first isolator.

19. The isolator fitting as defined in claim 15, wherein the conduit is metallic and has a permanent nut fixedly attached to the outer surface and a threaded segment extending along a length of the outer surface, the nut being mountable to the threaded segment to be spaced apart from the permanent nut to define an isolator gap, a portion of the first isolator being positionable in the isolator gap between the nut and the permanent nut.

20. The isolator fitting as defined in claim 15, wherein the first and second isolators are configured to dissipate electrical charge into the rib.

21. The isolator fitting as defined in claim 15, wherein the first and second isolators include aligned fastener openings spaced apart from the first and second isolator openings, and the isolator fitting further comprises at least one fastener being extendable through the aligned fastener openings.

22. The isolator fitting as defined in claim 15, wherein the first and second isolators are made of polyetheretherketone.

23. A method of electrically insulating and supporting a fluid pipe from a metallic rib of an aircraft wing, the method comprising:
 mounting a first isolator about a conduit to extend the conduit through a first isolator opening of the first isolator;
 securing the first isolator to the conduit by tightening a nut about an outer surface of the conduit to abut the first isolator;
 mounting a second isolator about the conduit to at least partially enclose the nut such that the nut is housed within a segment of the second isolator, the segment defining a second isolator opening;
 securing the first and second isolators to the metallic rib to support the conduit therefrom such that the conduit extends through an opening in the metallic rib and through the first and second isolator openings; and
 mounting the fluid pipe to the conduit.

24. The method as defined in claim 23, wherein securing the first and second isolators to the metallic rib includes abutting the second isolator against a first side of the rib, and abutting the first isolator against the second isolator on the first side of the rib.

25. The method as defined in claim 23, wherein securing the first and second isolators to the metallic rib includes forming a gap between the rib and the nut, the segment of the second isolator being disposed within the gap and spaced apart from both the rib and the nut.

26. The method as defined in claim 25, further comprising filling the gap with a sealant.

27. The method as defined in claim 23, wherein mounting the fluid pipe includes mounting a first fluid pipe segment to a first end of the conduit, and mounting a second fluid pipe segment to a second end of the conduit opposite to the first end.

28. The method as defined in claim 23, further comprising transferring an electrical charge from the first and second isolators to the rib.

29. The method as defined in claim 23, further comprising arresting sliding movement of the conduit along a direction parallel to an axis of the opening in the rib.

* * * * *